United States Patent [19]

Izumiya

[11] Patent Number: 5,323,325
[45] Date of Patent: Jun. 21, 1994

[54] METHOD OF DISPLAYING AN OPERATION HISTORY OF A MACHINE

[75] Inventor: Shunzo Izumiya, Fujiyoshida, Japan

[73] Assignee: Fanuc Ltd., Yamanashi, Japan

[21] Appl. No.: 663,946

[22] PCT Filed: Jul. 19, 1990

[86] PCT No.: PCT/JP90/00931
 § 371 Date: Mar. 18, 1991
 § 102(e) Date: Mar. 18, 1991

[87] PCT Pub. No.: WO91/01197
 PCT Pub. Date: Feb. 7, 1991

[30] Foreign Application Priority Data

Jul. 20, 1989 [JP] Japan .................... 1-186045

[51] Int. Cl.$^5$ ............................. G06F 15/46
[52] U.S. Cl. ..................... 364/474.16; 364/474.22; 364/188
[58] Field of Search ............ 364/474.16, 183–186, 364/146, 188, 193, 189; 371/29.1, 16.5

[56] References Cited

U.S. PATENT DOCUMENTS 4,251,858 2/1981 Cambigue et al. ............ 364/189
4,479,197 10/1984 Haas ............................. 364/188
4,672,574 6/1987 Baird et al. .................. 371/29.1

FOREIGN PATENT DOCUMENTS 59-119413 7/1984 Japan .
60-201407 11/1985 Japan .

OTHER PUBLICATIONS

*Tool and Manufacturing Engineers Handbook*, Daniel B. Dallas, Third Ed., pp. 12-117–12-123, 1976.

*Numerical Control*, R. M. Dyke, Prentice-Hall, Ch. 11, pp. 119–137, 1967.

Primary Examiner—Long T. Nguyen
Assistant Examiner—Jim Trammall
Attorney, Agent, or Firm—Staas & Halsey

[57] ABSTRACT

A method of displaying an operation history of a machine, which permits quick and proper investigation of the causes of troubles and trouble-shooting therefor. A processor of a numerical control device mounted on the machine writes a block number in a corresponding address region of a memory every time one block of a machining program is read out, and executes the block after an index indicating the address region to be stored with the next block number is determined (S1 to S4, S6). If the determined index exceeds a value indicating the last address region, the index is reset to a value indicating the first address region (S5). During the execution of each block, the processor successively determines, with respect to all the circuit sections of an input/output circuit, the presence/absence of signal transfer through each circuit section (S12), and causes a memory address region corresponding to the block to successively store codes individually indicating those circuit sections concerned in the signal transfer (S13), so that block numbers indicating up-to-date blocks and codes indicating the circuit sections concerned in the signal transfer during the execution of the blocks are continually held in their associated memory address regions, whereby the operation history of the machine is recorded. In response to a display command, the block numbers and codes constituting the operation history are successively displayed on a display screen according to precedence (S21 to S26).

4 Claims, 4 Drawing Sheets

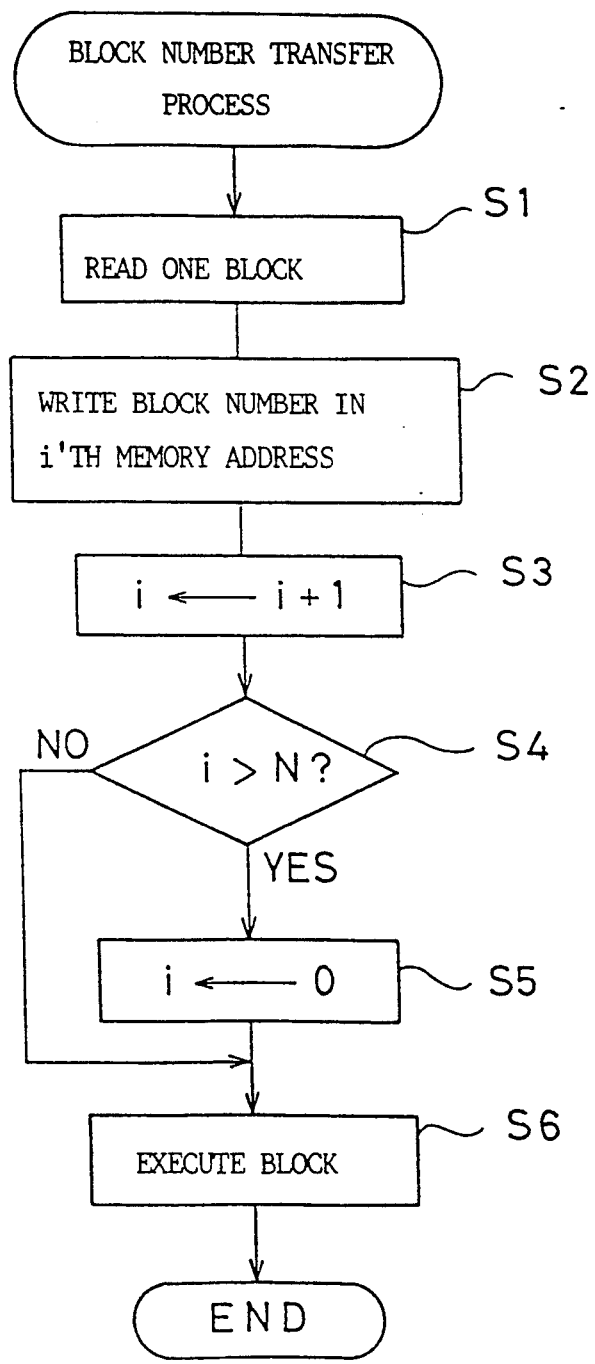

METHOD OF DISPLAYING AN OPERATION HISTORY OF A MACHINE

TECHNICAL FIELD

The present invention relates to an operation history display method which permits quick and proper investigation of the causes of troubles in a machine, especially in a machine tool controlled by a numerical control device, and permits trouble-shooting therefor.

BACKGROUND ART

Conventionally known are various machine tools for performing various machining operations, such as cutting, turning, boring, electrical discharge machining, etc. under the control of a numerical control device. In general, the numerically-controlled machine tools of this type has a function to automatically stop the operation of the machine tool and automatically display an alarm message indicative of the kind of trouble when the trouble occurs during the operation. Therefore, the kind of trouble can be quickly specified. The operation of the machine tool, however, involves transfer of various control information signals, including various commands delivered from the numerical control device, various feedback signals delivered from sensor systems of the machine tool, and various commands and data manually inputted through a control panel, so that it is difficult to grasp the progress of the operation before the occurrence of the trouble with speed and accuracy. Accordingly, the investigation of all the causes of troubles requires labor except those ones, such as machining program errors, which can be specified relatively easily. In order to restart the operation of the machine tool in the same operating conditions as when trouble is caused, moreover, the operating conditions at the time of occurrence of the trouble must be ascertained. However, if an operator operates a reset button by mistake, for example, the operating conditions will be initialized. It is difficult, therefore, to grasp the operating conditions at the time of occurrence of the trouble in accordance with the contents of a machining program only. This constitutes a hindrance to the restart of the operation.

DISCLOSURE OF THE INVENTION

The object of the present invention is to provide a method of displaying an operation history of a machine, which permits quick and proper investigation of the causes of troubles and trouble-shooting therefor.

In order to achieve the above object, a method of displaying an operation history of a machine according to the present invention comprises the steps of: (a) successively storing, in a plurality of address regions of a memory, block informations individually indicative of a plurality of up-to-date blocks in a machining program composed of a series of blocks to be read block by block; (b) successively discriminating those circuit sections of an input/output circuit concerned individually in the transfer of control information between the machine and a control unit during the execution of each block; (c) successively writing code informations, individually indicative of the circuit sections judged to have been concerned in the control information transfer, in the memory address regions corresponding to the block in execution at the point of time of the judgment; and (d) displaying the storage contents of the memory in accordance with a display command.

According to the present invention, as described above, the block informations indicative of the blocks in the machining program and the code informations indicative of the circuit sections concerned in the control information transfer are successively written in the memory to update the storage contents of the memory, so that the up-to-date operation history of the machine tool can be recorded. Since the operation history is read out as required from the memory, moreover, an operator can analyze the displayed operation history to investigate the causes of troubles and the like in detail. In an electrical discharge machining apparatus or the like, moreover, interrupted machining can be restarted in the same or like conditions as when the machining is interrupted.

BRIEF DESCRIPTION OF THE DRAWINGS

FIG. 2 is a flow chart showing a block number transfer process executed by means of a processor of the numerical control device;

BEST MODE OF CARRYING OUT THE INVENTION

Figure 1:
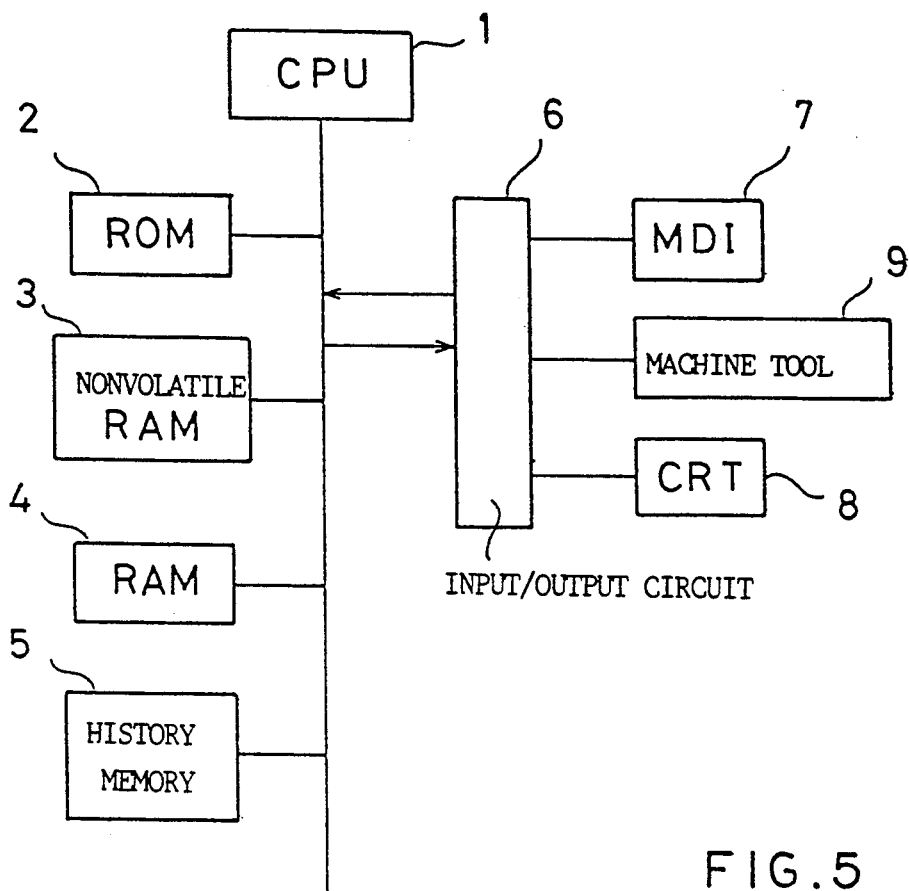
FIG. 1 is a schematic block diagram showing a numerical control device for embodying a method according to one embodiment of the present invention, and its peripheral elements.

Referring to FIG. 1, a numerical control device for embodying an operation history display method according to one embodiment of the present invention is mounted on, for example, a machine tool. The machine tool comprises, for example, various machine operating sections (not shown), servo circuits (not shown) for controlling the drive of servomotors for use as drive sources for some of the machine operating sections, sequence control elements, such as solenoid valves, electromagnetic relays, etc., for use as drive sources for other machine operating sections, sensor systems (not shown) for detecting the operating states of the machine operating sections and motors, etc.

Figure 5:
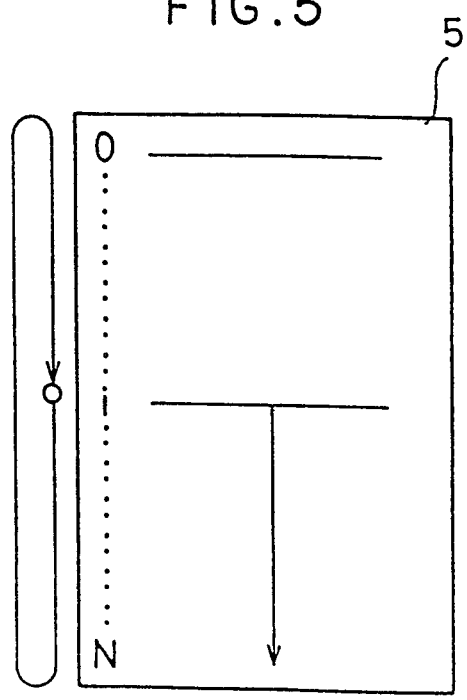
FIG. 5 is a diagram illustrating, by way of example, an operation history stored in a memory of the numerical control device.

The numerical control device comprises a microprocessor (CPU) 1, a read-only memory (ROM) 2 stored with a control program, a nonvolatile random access memory (RAM) 3 for storing a machining program, various machining conditions, and various set values, a RAM 4 for temporarily storing results of arithmetic operation by means of the CPU 1 and the like, and a history memory 5 for recording an operation history of the machine tool, the history memory 5 being formed of a RAM having zeroth to N'th address regions (FIG. 5). The numerical control device further comprises an input/output circuit 6 including (m+1) number of input circuit sections and output circuit sections in total, a manual data input device (MDI) 7, and a display device (CRT) 8. These elements 2 to 6 are individually connected to the CPU 1 by means of a bus. Each input circuit section of the input/output circuit 6 includes an input register connected to its corresponding one of the input elements, including the MDI 7, the sensor systems of the machine tool 9, etc., and adapted to hold control input data from the corresponding input element, and a status buffer register connected to its corresponding input element and adapted to store a status signal indicative of an authorization/inhibition state for data transmission from the corresponding input element. Further, each output circuit section of the input/output circuit 6 includes an output register connected to its corresponding one of the output elements, including the CRT 8, the drive sources for the machine operating sections, etc., and adapted to hold control output data to the corresponding output element, and a status buffer register connected to its corresponding output element and adapted to store a status signal indicative of an authorization/inhibition state for data transmission to the corresponding output element. Some output circuit sections are each formed of a servo interface whose output side is connected to the servo circuit.

Figure 3:
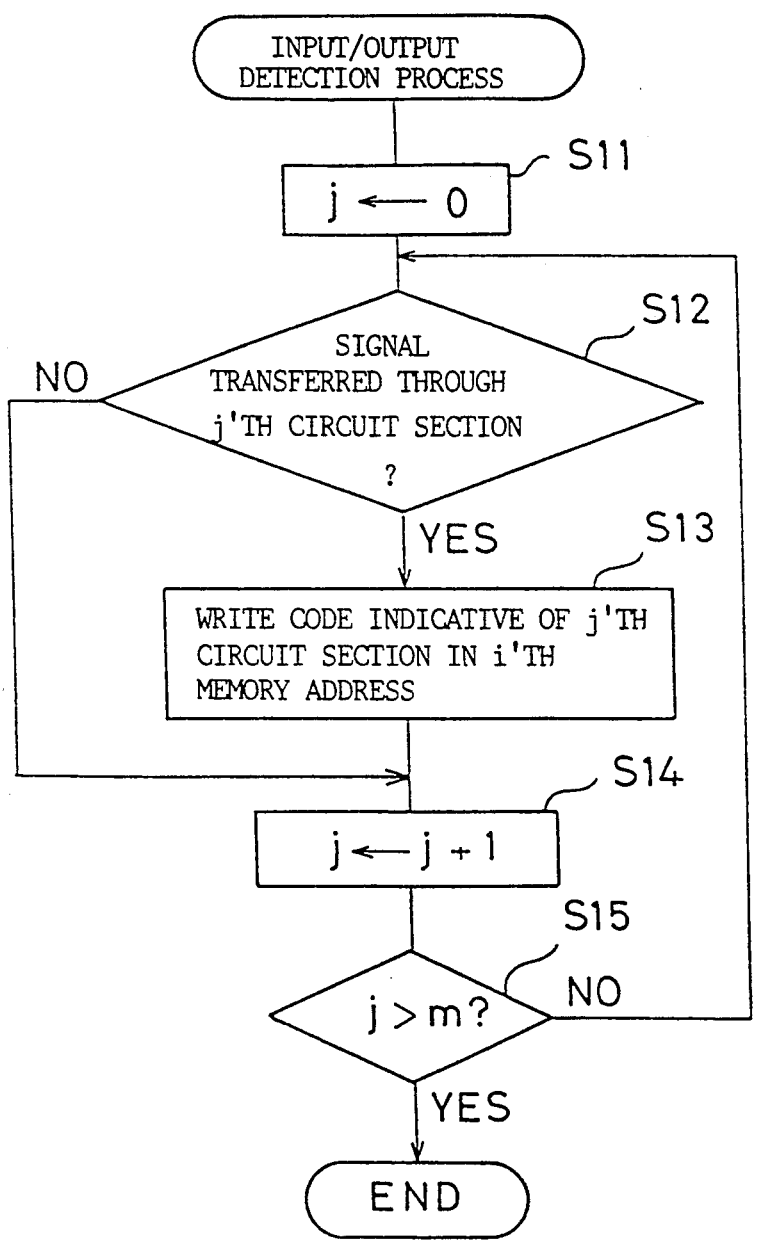
FIG. 3 is a flow chart showing an input/output detection process executed by means of the processor.
Figure 4:
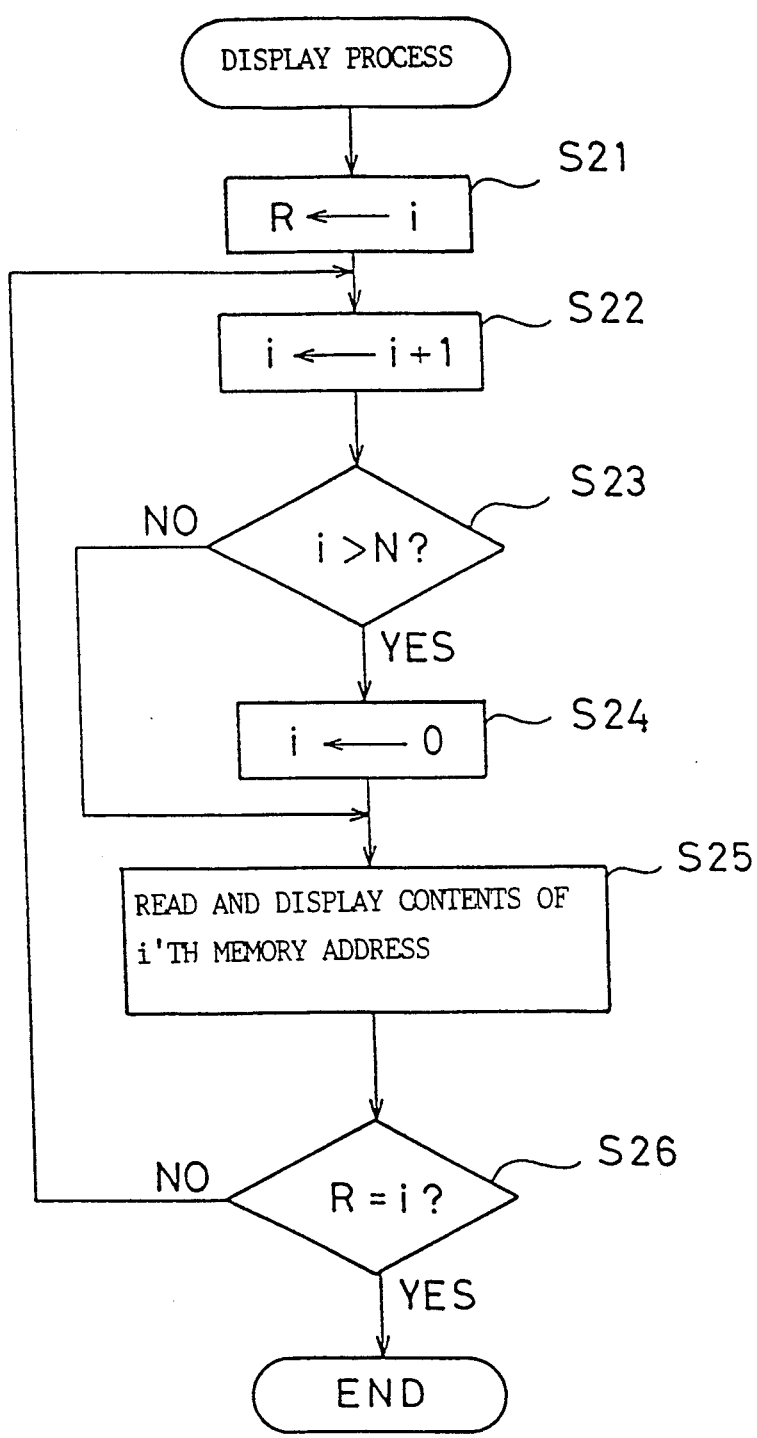
FIG. 4 is a flow chart showing a display process executed by means of the processor.

Referring now to FIGS. 2 to 4, the operation of the numerical control device will be described.

After the value of a first index i stored in a built-in register of the CPU 1 is reset to "0," the CPU repeatedly executes the process of FIG. 2 at intervals of a predetermined period in accordance with the control program stored in the ROM 2, thereby executing the machining program stored in the nonvolatile RAM 3.

First, the CPU 1 reads out a first block of the machining program from the RAM 3 (Step S1 of FIG. 2), and writes a block number indicative of this block in the zeroth address region of the history memory 5 (Step S2). Then, the CPU 1 increments the value of the first index i by "1" (Step S3), and determines whether or not the updated value (=1) of the index i is greater than the value N which is indicative of the final address region of the memory 5 (Step S4). Since the result of decision in Step S4 is negative in this case, the CPU 1 executes the first block (Step S6).

Thereafter, the CPU 1 reads out the machining program block by block (Step S1), writes a block number indicative of the block concerned in the corresponding one of the first to N'th address regions of the history memory 5 (Step S2), and determines whether or not the value of the first index i updated in Step S3 is greater than the value N (Step S4). If the value of the index i is smaller than the value N, the block read out in Step S1 is executed (Step S6). If it is concluded in Step S4 for a certain processing period, thereafter, that the value of the first index i is greater than the value N, and therefore, that the block numbers are already written in all of the zeroth to N'th address regions of the history memory 5, the CPU 1 resets the value of the first index i to "0," thereby allowing the block number to be written in the zeroth address region of the history memory 5 in the next processing period (Step S5), and then executes the block read out in Step S1 (Step S6).

During the execution of one block of the machining program at Step S6, signals are usually transferred between the CPU 1 and the machine tool 9 and the like through one or more associated input and output circuit sections of the input/output circuit 6. The control information signals transferred between the elements 1 and 9 and the like include control input signals to the CPU 1, including an initialization signal, which is produced when a reset button is depressed, an over-travel signal, etc., and control output signals delivered from the CPU 1.

In order to observe the presence/absence of the generation of the various control information signals transferred through the input/output circuit 6 and the types of the generated signals, during the execution of the block in Step S6 of FIG. 2, the CPU 1 executes the input/output detection process of FIG. 3 concurrently with the execution of the block by time sharing. During the execution of the one block, the process of FIG. 3 is preferably executed a plurality of times at intervals of a predetermined period determined by taking account of the duration of the control information signals, so as to detect the control information signals without omission.

At the start of the input/output detection process for one block, e.g., a k'th block, the CPU 1 resets a second index j to the value "0" (Step S11). Then, the CPU 1 discriminates the presence/absence of signal transfer through a zeroth circuit section of the input/output circuit 6 corresponding to the second index j (=0), on the basis of a decision on whether or not control data is set in the register (input register or output register) of the zeroth circuit section (Step S12). The decision of Step S12 may alternatively be made on the basis of a value stored in the status buffer register of the zeroth circuit section or on the basis of whether or not the stored value of the register of the zeroth circuit section is changed between the preceding and present detection periods (same applies to the cases of the other circuit sections).

If it is concluded in Step S12 that signal transfer through the zeroth circuit section (j'th circuit section in general) is executed, the CPU 1 writes a code indicative of the zeroth circuit section (j'th circuit section in general) in an i'th address region of the history memory 5 corresponding to the first index i subsequently to the block number previously written in the i'th address region (Step S13). Then, after the second index j is incremented by the value "1" (Step S14), it is determined whether or not the a value m indicative of the last circuit section of the input/output circuit 6 is exceeded by the updated value of the second index j (Step S15). If it is concluded in Step S12 that there is no signal transfer through the zeroth circuit section, the program proceeds to Step S14 without the execution of Step S13.

If it is concluded in Step S15 that the second index j is not higher than the value m, that is, the decision on the execution of signal transfer is not finished for all of the zeroth to m'th circuit sections of the input/output circuit unit, the program returns to Step S12, and the presence/absence of signal transfer through the first circuit section (j'th circuit section in general) is discriminated. Thereafter, the program returns to Step S12 every time it is concluded in Step S15 that the value m is not reached by the updated value of the second index j. If it is concluded in Step S15, thereafter, that the value m is exceeded by the second index j, that is, the decision in Step S12 is finished for all the circuit sections, the input/output detection process (FIG. 3) for the present period ends. During the execution of the k'th block, thereafter, the process of FIG. 3 is repeatedly executed at intervals of the predetermined period. As a result, codes individually indicative of those circuit sections of the input/output circuit unit 6 concerned individually in the signal transfer between the CPU 1 and the elements 7 and 8, during the execution of the k'th block, are successively written in the i'th address region of the history memory 5.

After the execution of the k'th block, the CPU 1 proceeds to Step S1 of FIG. 2, whereupon it reads out the next block, a (k+1)'th block. While executing this block, the CPU 1 cyclically executes the process of FIG. 3. The subsequent blocks are handled in like manner. As a result, besides a block number indicative of a corresponding one of the latest (N+1) number of blocks, codes indicative of the circuit sections concerned in the signal transfer during the execution of the corresponding block is written in each of (N+1) number of address regions of the history memory 5. Thus, an up-to-date operation history of the machine tool is recorded on the history memory 5.

This operation history is displayed on the screen of the CRT 8 in response to a display command given automatically or by manual operation in case of any trouble in the operation of the machine tool. To effect this operation history display, the CPU 1 executes a display process of FIG. 4.

First, the CPU 1 causes the built-in register R thereof to store the first index i which is indicative of the address region of the history memory 5 in which one data group (block number and code) is written last in the processes of FIGS. 2 and 3 (Step S21). Then, the index i is updated for an increment of "1" (Step S22). Thus, the first index i is updated to a value corresponding to the oldest data group among the data groups stored in the history memory 5. Then, it is determined whether or not the updated value of the index i exceeds the value N which is indicative of the last address region of the history memory 5 (Step S23). If the value of the index i is not greater than the value N, the oldest data group is read out from the i'th address region of the history memory 5 and displayed on the screen of the CRT 8 (Step S25). On the other hand, if it is concluded that the index i exceeds the value N, that is, if it is concluded that the last data is written in the N'th address region of the history memory 5 so that there is no address region corresponding to the index i (=N+1) in the memory 5, the index i is reset to the value "0," which is indicative of the zeroth address region loaded with the oldest data group, whereupon the program proceeds to Step S25.

Then, the CPU 1 determines whether or not the index i is equal to a value stored in the register R and indicative of a memory address loaded with the up-to-date data group (Step S26). If it is concluded that the index i is not equal to the value stored in the register R, that is, all of the (N+1) number of data groups in the history memory 5 are not displayed yet, the program returns to Step S22. In this manner, Steps S22 to S25 are executed every time the result of decision in Step S26 becomes negative, whereby the data groups stored in the history memory 5 are successively displayed on the CRT screen according to precedence. If the index i, which is updated by "1" at a time, exceeds the value N during this display process, the index i is reset to "0" in Step S24.

If it is concluded in Step S26 of the subsequent display process period that the value stored in the register R is reached by the index i, the display process of FIG. 4 ends. As a result, block numbers, individually indicative of the latest (N+1) number of blocks of the machining program executed by means of the numerical control device, and codes, individually indicative of those circuit sections of the input/output circuit 6 concerned in the signal transfer between the CPU 1 and the elements 7 to 9, during the execution of these blocks, are successively displayed on the CRT screen. Thus, the operation history of the machine tool executing the latest (N+1) number of blocks is displayed.

The present invention is not limited to the embodiment described above, and various modifications may be effected therein.

For example, although the history memory 5, in the above embodiment, is loaded with the block numbers, the contents of the blocks may alternatively be recorded. In the foregoing embodiment, moreover, the memory 5 is designed for operation history recording only. Alternatively, however, part of the nonvolatile RAM 3 or part of the RAM 4 may be used as the history memory 5.

I claim:

1. A method of displaying an operation history of a numerically controlled machine during control by a numerical control unit, comprising the steps of:
    (a) successively storing, in address regions of a memory, block information indicative of each block in a numerically controlled machining program, the numerically controlled machining program composed of a series of the blocks to be read block by block;
    (b) successively detecting state information identifying circuit sections of an input/output circuit concerned in control information transfer between the numerically controlled machine and the numerical control unit during execution of each block and discriminating those circuit sections to have been concerned in the control information transfer;
    (c) successively storing the state information corresponding to said circuit sections discriminated in said step (b) to have been concerned in the control information transfer, said state information stored in one of the memory address regions corresponding to the block during execution; and
    (d) displaying the storage contents of the memory in accordance with a display command.

2. A method of displaying an operation history of a numerically controlled machine during control by a numerical control unit according to claim 1, wherein said step (d) includes the steps of:
    (d1) determining an address region of the memory containing an oldest of the block information;
    (d2) successively updating an index indicative of the address region determined in said step (d1) to successively determine subsequent address regions;
    (d3) determining a first address region of the memory as a next address region when no address region of the memory corresponds to the index updated in said step (d2); and
    (d4) successively displaying the stored contents of the address region determined in said step (d1) and the subsequent address regions.

3. A method of displaying an operation history of a numerically controlled machine during control by a numerical control unit according to claim 1, wherein each said block information is a block number indicative of a corresponding block.

4. A method of displaying an operation history of a numerically controlled machine during control by a numerical control unit according to claim 1, wherein each said block information is the contents of a corresponding block.

* * * * *